United States Patent
Svensson et al.

(10) Patent No.: US 11,350,577 B2
(45) Date of Patent: Jun. 7, 2022

(54) FLEXIBLE LAYERED SHEET

(71) Applicant: ARUP VENTURES LIMITED, London (GB)

(72) Inventors: Johan Svensson, Stockholm (SE); Hans Andersson, Stockholm (SE); Alistair Law, London (GB)

(73) Assignee: DESIGNLAW LIMITED, London (GB)

( * ) Notice: Subject to any disclaimer, the term of this patent is extended or adjusted under 35 U.S.C. 154(b) by 604 days.

(21) Appl. No.: 16/312,886

(22) PCT Filed: Jun. 28, 2017

(86) PCT No.: PCT/GB2017/051886
§ 371 (c)(1),
(2) Date: Dec. 21, 2018

(87) PCT Pub. No.: WO2018/002611
PCT Pub. Date: Jan. 4, 2018

(65) Prior Publication Data
US 2019/0357449 A1    Nov. 28, 2019

(30) Foreign Application Priority Data
Jun. 28, 2016  (GB) ..................................... 1611220

(51) Int. Cl.
*A01G 9/02* (2018.01)
*A01C 1/04* (2006.01)

(52) U.S. Cl.
CPC .............. *A01G 9/025* (2013.01); *A01C 1/044* (2013.01)

(58) Field of Classification Search
CPC ........ A01G 9/025; A01G 9/022; A01G 9/033; A01G 27/00; A01G 31/00; A01G 31/02; A01G 31/06; A01C 1/044
See application file for complete search history.

(56) References Cited

U.S. PATENT DOCUMENTS 2,826,865 A * 3/1958 Chohamin ............. A01C 1/044
                                                            47/56
4,863,776 A   9/1989 Sternlieb
(Continued)

FOREIGN PATENT DOCUMENTS

CH          706820          2/2014
CN        201772195         3/2011
(Continued)

OTHER PUBLICATIONS

BB Patent Application No. 1611220.3, Search Report dated Nov. 16, 2016, 2 pages.
(Continued)

*Primary Examiner* — Kathleen I Alker
(74) *Attorney, Agent, or Firm* — Leber IP Law; Shelly M. Fujikawa

(57) ABSTRACT

A flexible layered fabric sheet comprising a porous front layer and a pre-seeded substrate layer, where the seeds are in-between the two layers (rather than at the back of the substrate layer), for supporting root growth, the two layers together having an upper and lower edge and being attached together with one or more non-continuous seams between the upper and lower edges, which seams have a component of direction parallel to the upper and/or lower edge, and wherein the non-continuous seams enable water to exit the layered fabric sheet at its lower edge, and the non-continuous seams further serve to slow water flow through the water sheet. The seams also serve to keep the two layers from separating which would hamper the penetration of the sapling through the front porous layer, and thus stunt growth.

17 Claims, 3 Drawing Sheets

(56) References Cited

U.S. PATENT DOCUMENTS

| | | | |
|---|---|---|---|
| 5,437,239 A | 8/1995 | Blake | |
| 7,045,191 B2 | 5/2006 | Huntley | |
| 8,578,651 B1 | 11/2013 | Giacomantonio | |
| 9,440,411 B2 | 9/2016 | Hellwig | |
| 2010/0199406 A1 | 8/2010 | Dua et al. | |
| 2014/0370238 A1 | 12/2014 | Vanderbecken et al. | |

FOREIGN PATENT DOCUMENTS

| | | | |
|---|---|---|---|
| CN | 201772199 | 3/2011 | |
| CN | 201995364 | 10/2011 | |
| DE | 19900202 | 7/2000 | |
| EP | 0071211 | 2/1983 | |
| EP | 2428110 A1 * | 3/2012 | ............. A01G 9/025 |
| EP | 2692225 | 2/2014 | |
| FR | 2960384 A1 * | 12/2011 | ............. A01G 9/025 |
| KR | 200412590 Y1 * | 3/2006 | ........... E02D 17/202 |
| WO | 2015075465 | 5/2015 | |

OTHER PUBLICATIONS

PCT Patent Application No. PCT/GB2017/051886, Written Opinion dated Sep. 15, 2017, 6 pages.
PCT Patent Application No. PCT/GB2017/051886, International Search Report dated Sep. 15, 2017, 3 pages.

* cited by examiner

FLEXIBLE LAYERED SHEET

RELATED APPLICATIONS

This application is a national phase entry of International Patent Application No. PCT/GB2017/051886, filed Jun. 28, 2017, which claims priority from Great Britain Patent Application. No. 1611220.3, filed Jun. 28, 2016, the entire disclosures of which are incorporated herein by reference.

This invention relates to a flexible layered sheeting system. In particular, it relates to a flexible layered fabric sheeting system for supporting growth of vegetation from seed.

Layered façade panels and other rigid building panels are known which include a layer which supports vegetation growth. These can be mounted onto buildings or walls, or used in the construction of these, to provide a "green" wall by which vegetation grows on the wall itself.

There are many advantages to having vegetation growing on structures and buildings, including increasing urban biodiversity, improving health and well-being for urban citizens, reducing urban heat island effects, providing acoustic attenuation and thermal regulation, improving air quality by removal of pollutants, removing $CO_2$ in the air and replacing it with oxygen and general architectural/aesthetic benefits. In addition, it can provide habitats for plant and animal life in cities. Furthermore, during construction of a building, ugly scaffolding is generally erected around the building whilst it is under construction, and hoardings and fences are provided around the periphery of a building site in order to keep out intruders and render the site safe. These are often quite ugly or stark in appearance and can benefit from attractive aesthetic features, particularly ones which are relatively easy to install and remove after the scaffolding or hoarding is no longer needed. Vegetation may also bring other benefits on a construction site, such as helping to control dust and attenuate noise.

U.S. 2014/370238A1 discloses a vegetative textile element having a back face, front face, a layer of synthetic felt and a layer of synthetic polymer. The layers are joined together by a waterproof heat welded seam at their edges, in effect producing a sealed pocket. Thus joining multiple sheets together does not allow shared irrigation between sheets therefore using more water by not sharing via gravity from sheet to sheet.

According to the present invention in a first aspect there is provided a flexible layered fabric sheet comprising a porous front layer and a pre-seeded substrate layer for supporting root growth, the two layers together having an upper edge and a lower edge and being attached together with one or more non-continuous seams between the upper and lower edges, which seams have a component of direction parallel to the upper and/or lower edge, and wherein the non-continuous seams enable water to exit the layered fabric sheet at its lower edge, and the non-continuous seams further serve to slow water flow through the sheet in a direction from the upper to the lower edge.

Preferably, a plurality of seams are provided.

Preferably, the seams are stitched seams.

By 'non-continuous' is meant that there are gaps in a seam. This may be done using stitching, in which there will be gaps between stitches, or by using intermittent welds, with gaps, or other ways.

The substrate layer can be termed a "root-mat" layer, being a layer which can support the roots of growing plants.

The non-continuous seams enable water and/or nutrients to pass across the seams.

The seams are preferably spaced apart at intervals between the upper and lower edges, with the seams being spaced apart in parallel in one embodiment.

The seams are most preferably all linear, (i.e. they extend in a straight line without substantial curves or bends) although one or more of them may be curved or non-linear.

Most preferably, the system also comprises an irrigation system for delivering water and nutrients to the substrate layer.

A backing layer may be provided on the side of the substrate layer which is distal from the porous front layer. This backing layer may also be a flexible layer, so that the entire sheeting system is a flexible one which can be mounted upon scaffolding or a hoarding for example.

In a further aspect there is provided a vegetative wall, comprising one or more flexible layered fabric sheets as above, mounted upon a structure or substrate such that the upper edge of the or each sheet lies vertically higher than the lower edge and an irrigation supply is arranged at or towards the top of the sheet or the top of at least the uppermost one of the sheets, such that irrigation water flows downwards through the sheet or sheets, slowed by the non-continuous seams, to thereby enable the seed with which the sheet or sheets is or are pre-seeded to germinate and grow into vegetation.

In a yet further aspect there is provided a method of forming a vegetative wall, comprising mounting at least one flexible sheet as above upon a structure or substrate such that the or each sheet lies in a disposition such that its upper edge is vertically higher than its lower edge, providing an irrigation supply to supply irrigation water at or towards the top of the sheet or at least the uppermost one of the sheets and allowing water to permeate through the sheet or sheets to thereby cause the seeds which the or each sheet has been pre-seeded with to germinate, and vegetation to grow.

A flexible fabric sheeting system has advantages over the rigid system of the prior art. It is thin, lightweight, and can be used in a greater variety of applications. It may be cheaper to fabricate, handle and install. It may also be biodegradable.

In normal use, the sheeting system may be intended to be placed in a disposition with its top edge higher than its lower edge such that the seams have a horizontal component. In some embodiments, only some or the majority of the seams have a horizontal component. The sheeting system could be placed vertically, or at any angle, for example on a pitched roof.

The non-continuous (e.g. stitched) seams have several advantages: They serve to keep the front and substrate layers together to prevent large pockets opening between the two layers. It is also preferable that these layers be kept close together to enable germination of seeds through the front. The seams also slow water flow through the system. They also aid the uniform distribution of water and nutrients throughout the sheet. The seams may also provide a channel through which the irrigation tubes can be run (typically in a generally horizontal disposition and located towards the top edge) and they provide structural strength to the substrate layer. The seams therefore keep the layers in close proximity and prevent "billowing" between layers.

Peripheral seams may also be used, but again these will be non-continuous e.g. stitched, so as not to prevent water flow.

The porous front layer may be of a material such as a coir mesh, hemp mesh, hessian material or other biodegradable fibrous organic mesh material. The use of an organic material for this has the benefit of holding water and of course being sustainable and compostable. It can also provide nutrients to the plants during use. However, the layer may be of other material, such as a plastics material or a metal material which is provided with porosity via perforations or otherwise.

The substrate (root mat) layer may be a biodegradable material such as a fibrous fabric material. It may be a cotton material or may be a polyester root mat in some embodiments. It may be a non-woven material and it may be horticultural felt. In some embodiments it might be 1 cm thick but other thicknesses are possible.

The substrate layer could also be a recycled material. Other materials may of course be used for this layer and the other layers. By being biodegradable, the mat will also provide nutrients to the plants during use.

In some embodiments, the substrate layer may comprise a plurality of layers of the same or different materials. These can serve to increase the thickness and in doing so improve water retention capacity. Materials may be chosen with longer, or shorter life spans according to the length of installation required by the application. This may manifest itself in biodegradable materials which decompose faster for living walls with a short lifespan and slower decomposing materials for a longer lifespan. This might result in synthetic materials being used where the wall must have a much longer lifespan to avoid decomposition.

The material layers, as well as the vegetation, may provide acoustic attenuation benefits for noisy construction sites or other locations. This acoustic attenuation from the mat itself is provided by the mass resulting from being a saturated fabric as well as from having multiple layers of fabric that form a sandwich with a certain thickness.

The substrate layer may be provided with seeds, seedlings or other growable vegetal matter. It can be pre-seeded simply by painting the material with seeds, by depositing them by hand or machine or may include a layer of seed material. Seed material or seed paper is known in the art and is a layer of a material which is already pre-impregnated with seed and which, after being applied, can either form part of the substrate layer or be a separate layer and may biodegrade and disappear, leaving the seeds in place. The seeds then grow through the perforations or porosity of the porous front layer. Irrigation means, such as a perforated pipe or pipes placed towards the top of the flexible fabric sheeting system, enable water and nutrients to be supplied to the seeds, aided by the stitched seams which have the advantages outlined above.

If a backing layer is provided, this may be of a non-porous sheet material such as that termed Monarflex™ (sourced from Icopal, UK) and which is used in standard scaffolding applications. This may enable simple fixing of the system to scaffolding using standard scaffolding fixation products. When a further backing layer is provided this may be sewed into the system using the same stitched seams that connect the porous front layer and the substrate layer or may be attached by a separate fixing such as one or more further stitched seams, or other means, to enable easy separation of the backing layer from the other layers. This may be advantageous if the backing layer is a non-biodegradable material but the other layers are biodegradable since the backing layer can then simply be removed for biodegrading of the other layers.

If a backing layer is provided this may be provided with a skirt which extends beyond the width of the other layers, allowing overlapping of the layer with an adjacent sheet where sheets are abutted, both to aid fixation and to provide waterproofing.

If the porous front layer and substrate layer are biodegradable they can be composted after use. Alternatively, the sheet can simply be placed on the ground in a generally horizontal disposition, or on a soil bed or any piece of ground and this provides an instant landscaping feature.

The sheeting system may be provided in discrete sheets of any size. The sheets may typically be the same size as standard scaffolding sheeting material which might be 1.5 m to 2.5 m or more in height (the top and lower edges respectively being the long edges). In this way they may be handled and installed using standard techniques in the temporary work industry for installing scaffolding, etc by being attached to scaffolding poles. The sheeting may be provided on a roll and an appropriate length drawn out and cut to size.

Other than fixing to scaffolding poles, sheets could be fixed to a temporary hoarding or solid wall made from timber or other materials. Rather than using scaffolding poles for affixing, the sheets might be affixed (eg by screws) directly to a timber or other hoarding that would provide an additional structure layer.

The substrate layer may include additional water retention means such as beads, for example clay beads, water crystals, vermiculite or otherwise.

Moisture sensors may be included in one or more of the layers or between the layers or on the edges, to alter to dryness and trigger the irrigation system accordingly.

A water reuse system can be included, where excess is collected in a gutter at the base of the lowest sheets in the wall and collected in a water tank. This can then be reused for the other purposes or recirculated, eg by a pump.

The seams may be spaced around 100 mm apart or 50 mm apart or other spacings. They are preferably spaced in parallel but need not necessarily be so.

In a further aspect, the invention provides a flexible sheet as described above mounted on a support such that the top edge is higher than the lower edge and one or more irrigation means provided towards the top of the sheet for providing irrigation to the sheets by the effects of gravity.

In another aspect there is provided a flexible layered fabric sheet comprising a porous front layer and a substrate layer for supporting root growth, the two layers together having an upper and a lower edge and being attached together with one or more non-continuous seams between the upper and lower edges.

Embodiments therefore provide a flexible layered fabric sheet comprising a porous front layer and a pre-seeded substrate layer, where the seeds are in-between the two layers (rather than at the back of the substrate layer), for supporting root growth, the two layers together having an upper and lower edge and being attached together with one or more non-continuous seams between the upper and lower edges, which seams have a component of direction parallel to the upper and/or lower edge, and wherein the non-continuous seams enable water to exit the layered fabric sheet at its lower edge, and the non-continuous seams further serve to slow water flow through the water sheet.

The seams also serve to keep the two layers from separating, which would hamper the penetration of the sapling through the front porous layer, and thus stunt growth.

Embodiments of the invention will now be described, by way of example only, with reference to the accompanying schematic drawings, in which.

Figure 1:
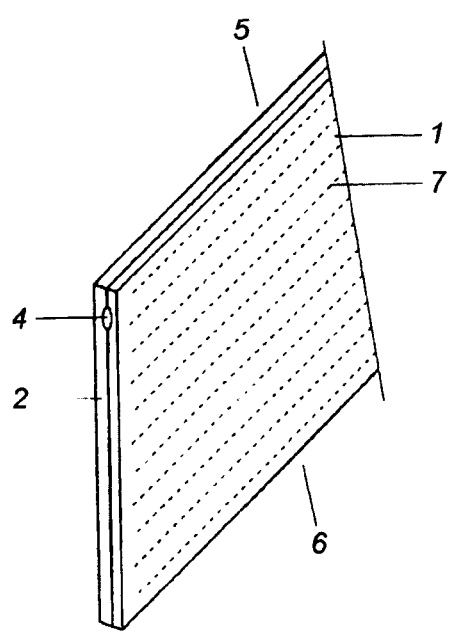
FIG. 1 shows part of a sheeting system.

Referring to FIG. 1, a simple fabric sheet system for supporting plant growth is shown. This comprises two flexible layers; a first layer 1 which is porous and which is adapted to hold seeds, seedlings or other vegetal matter in place and to support plant growth, and a substrate or "root mat" layer 2 for supporting root growth.

It also comprises an irrigation channel 4 which may be fitted with a pipe which is perforated, or a more complex system. This will generally be provided towards the top edge 5 which opposes bottom edge 6, and these edges will usually be parallel. Note that the sheeting may be supplied without a pipe or other irrigation system in place and this can be inserted later. The irrigation channel will generally be formed between layers 1 and 2, but may be formed anywhere between the porous front layer 1 and a backing layer 3 (see FIG. 2), for example between the substrate layer 2 and the backing layer 3, or within the plurality of substrate layers 2.

The porous front layer 1 may be any porous layer of flexible material and may, for example, conveniently be hessian, a coir mesh, hemp mesh or other biodegradable fibrous organic mesh. An organic material may have the benefit of holding water and also of course biodegradability is highly preferable in terms of life-cycle impact and providing nutrients to the plants. The front layer may be a plastic material however, which may of course be a biodegradable plastic or otherwise and could even be a metal or other material which is sufficiently thin to be flexible.

The substrate layer 2 may be a mat which is capable of sustaining plant growth and may be a polyester root mat. It can also be of a cotton or other organic material which will then render it biodegradable and therefore provide nutrients.

The layers 1 and 2 are connected (e.g. sewn) together with generally horizontal seams spaced between the upper 5 and lower edges 6. In one example the spacing between them may be around 100 mm (when the distance between the upper and lower edges is 1.5 meters). In another example, the spacing may be around 50 mm. However, other spacing may be used and the seams need not necessarily be equispaced.

Thus, the seams are preferably parallel to (or have a component parallel to, as the seams need not be horizontal), the upper 5 and/or lower 6 edge. Usually these upper and lower edges will be parallel to each other, but this need not be the case. When the sheet is mounted on a vertical support, the seams will have a horizontal component of direction.

As described, the seams have many advantages. If sewn, the stitching will be done by any convenient thread material such as a cotton material.

The seams are described as being horizontal. This means that they are preferably generally parallel to the upper and lower edges. These are termed upper and lower since in use the sheeting will be provided on a generally vertical support such as scaffolding and so the upper edge will be higher than the lower edge. The seams do not necessarily extend to the ends (ie side edges) of the sheeting.

Figure 2:
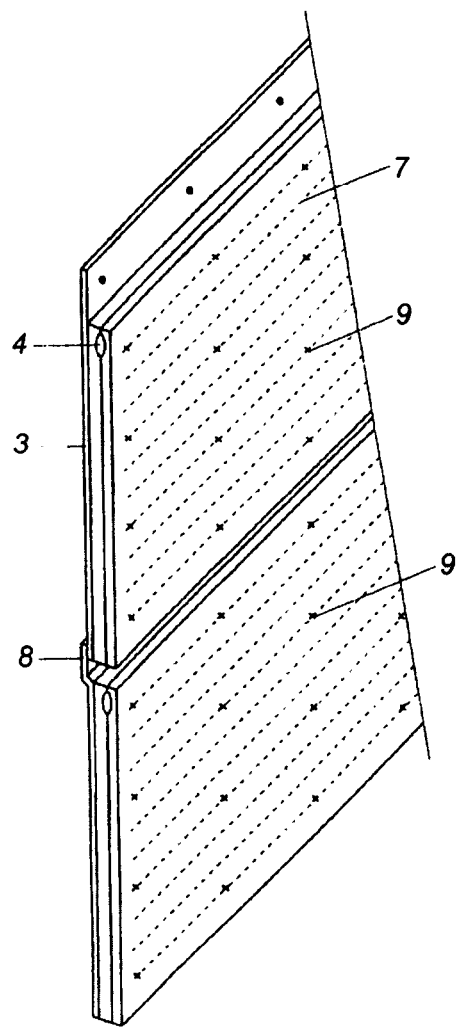
FIG. 2 shows part of alternative sheeting system.

FIG. 2 shows an arrangement which further comprises a backing layer 3. This is a non-porous (and therefore typically waterproof) sheet material and may be a plastics material or otherwise. It may conveniently be a type of material which is used in standard scaffolding applications such as a Monarflex™ (sourced from Icopal, UK). Desirable properties for this third backing layer may include high durability, UV resistance, flame retardance and other properties. It also stops plant growth backwards (ie in the direction of the scaffolding, hoarding or other support the sheets are attached to). By using a backing layer, the flexible sheet can be simply attached to a support such as scaffolding or a wall and standard scaffolding fixation products may be used, as are known themselves in the art.

Backing layer 3 may be attached by the same means used to form the seams 7 (i.e. the seams are made through all three layers). Alternatively, this backing layer may be attached separately with separate stitchings or other means, such as buttons, staples, eyelets and toggles or otherwise. The advantage of the latter system is that it enables easy separation of the backing layer 3 from a combination of layers 1 and 2 which will enable simple composting or reuse of the substructure of layers 1 and 2, separate from layer 3.

As shown in FIG. 2, backing layer 3 may be provided, at its highest edge, with a depending skirt 8 (a lip portion) which extends via a generally dogleg type configuration to extend the backing layer to a width greater than the width of layers 1 and 2. This enables overlapping of layer 2 with that of an adjacent sheet if two or more sheets are abutted vertically (as shown in FIG. 2). This can both aid fixation and also can provide a better degree of water proofing and minimisation of gaps between sheets. Skirts may also be provided at the side edge in some cases.

Figure 9:
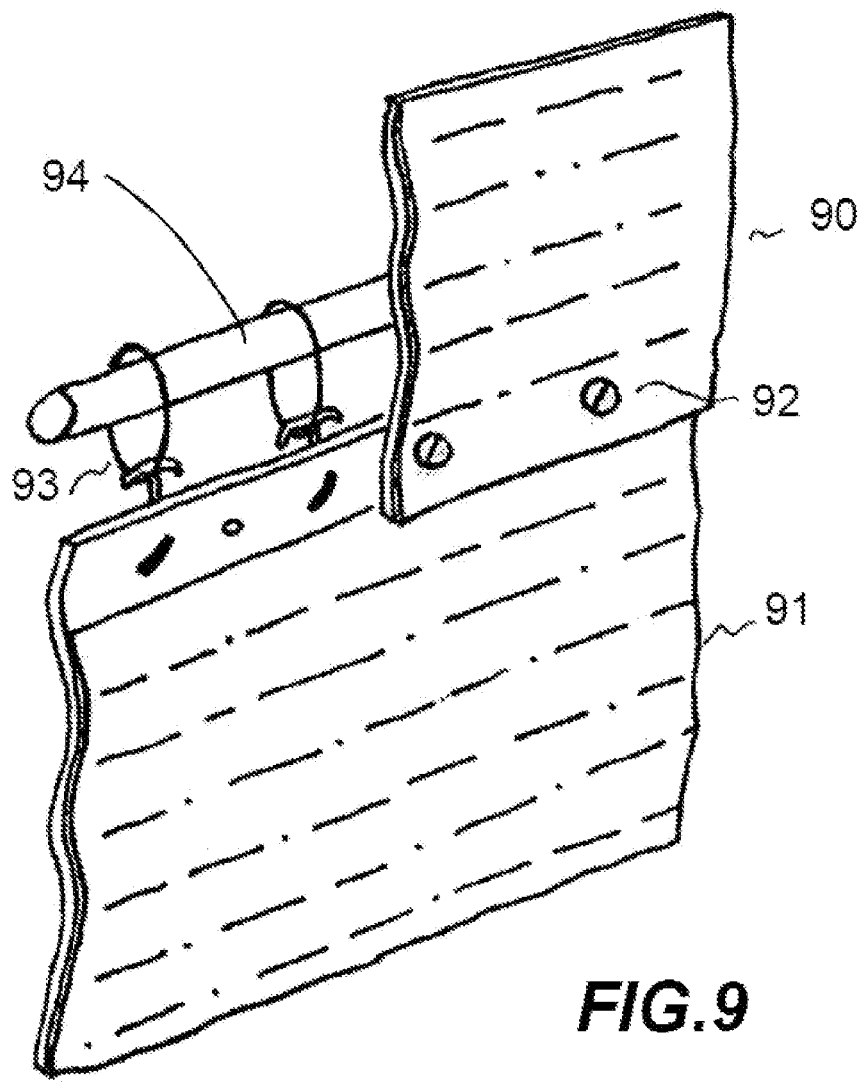
FIG. 9 shows two connected sheets affixed to a scaffolding system.

FIG. 9 shows that where a plurality of sheets is used, the fixing system between an upper sheet 90 and a lower sheet 91 can be formed by the higher sheet having a small overlap with the lower sheet and a fixing element that penetrates from the outside; first through the outer higher sheet and then the inner lower sheet to the structure behind. In order that both are held securely, a form of button or flat head screw 92 that ensures more bearing surface may be used for the affixing system. In a scaffolding installation, this could be done with a flexible tie 93 that penetrates both sheets from the outside to the inside and then attaches to the scaffolding bar 94 (a scaffolding pole) behind. In a hoarding configuration, this could be done using a screw that penetrates from the outside to the inside into the hoarding for support.

FIG. 2 shows a few discrete fixings 9 representing points where the backing layer 3 is fixed to the other layers.

Thus, two or more of the sheets may be abutted in use if necessary.

Figure 3:
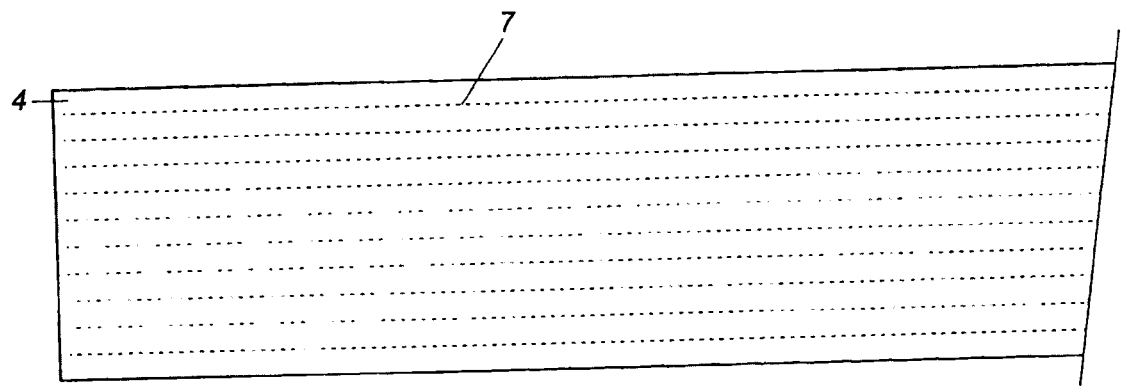
FIG. 3 shows a seam pattern.

FIG. 3 shows schematically a front view of a flexible sheet having a simple horizontal seam pattern.

Figure 4:
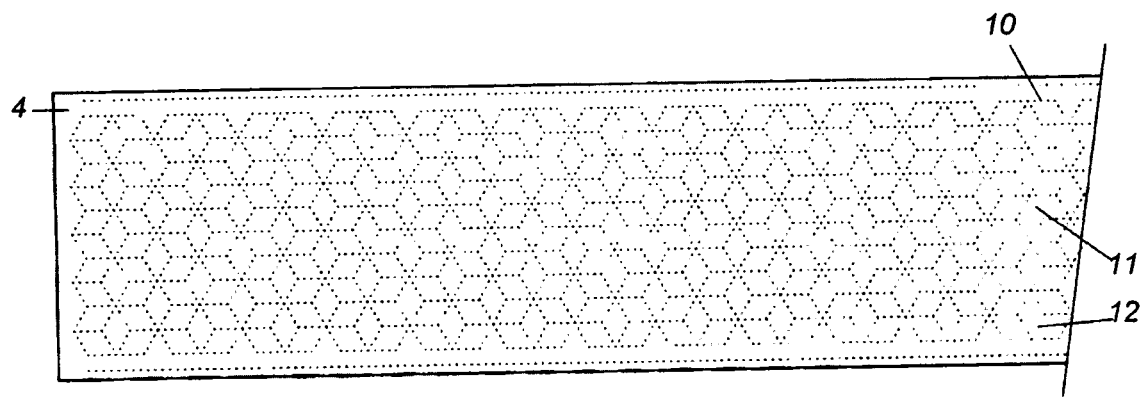
FIG. 4 shows an alternative seam pattern.

FIG. 4 shows an alternative arrangement in which the seam pattern is again generally horizontal but which is more complicated and includes a plurality of seam lines which include horizontal ones 10 and ones that have non-horizontal and non-vertical dispositions 11 and 12. This therefore forms a pattern of generally quadrilateral (e.g. diamond) shapes, formed by intersecting seams. Again, these are preferably all non-vertical (ie they have a direction component parallel to the upper 5 and/or lower 6 edge, but some of them might be "vertical" (i.e. normal to the upper and/or lower edge) in some embodiments.

Figure 5:
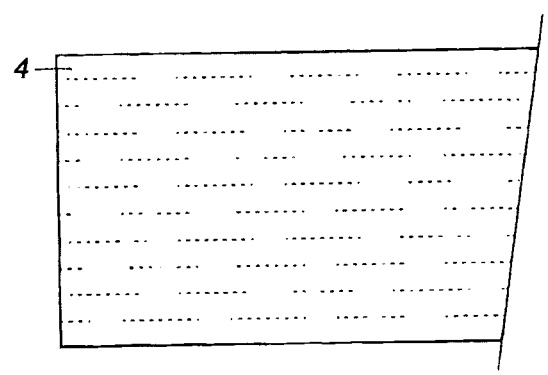
FIG. 5 shows a further alternative seam pattern.

Many different configurations of seam patterns may be used, e.g. curved seams or polygonal shapes, but in general the majority of the seams will be non-vertical. This enables water and nutrients from the irrigation system to disperse through and across the structure to most efficiently irrigate plant matter. If simply vertical seams were used, then water would generally be channelled vertically along them and this, in testing, produces worse effects, less plant growth and/or more uneven plant growth. In both FIGS. 3 and 4, the channel for insertion of an irrigation system 4 is shown at the top or towards the top edge. FIG. 5 shows a pattern where the seams are intermittent.

Figure 6:
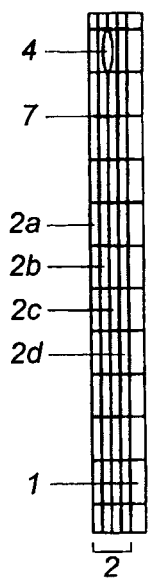
FIG. 6 shows a side view of an alternative sheet system.

FIG. 6 shows a cross-section of an alternative in which the substrate layer 2 is comprised of a plurality of layers 2a, 2b, 2c and 2d. These may all be of the same material or of different material. This can increase the thickness of layer 2 and thus improve water retention capacity for example. There may be two, three, four or more of these layers. In this example, the irrigation channel 4 is provided within the plurality of layers 2. Layer 2d is seed paper. It also shows the seams 7 (shown at regular intervals) joining the porous front layer and substrate layers 2.

Figure 7:
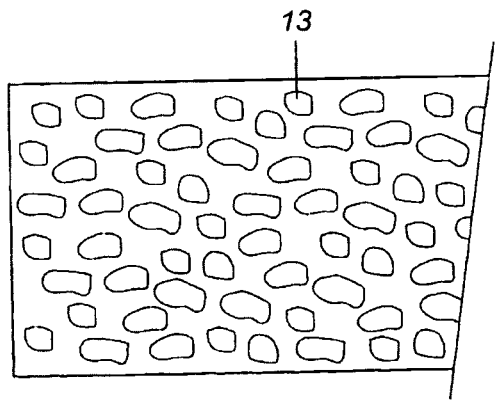
FIG. 7 shows a front view of a system.

FIG. 7 shows very schematically a front view of a sheet system which is installed in a generally vertical disposition on a scaffolding or other support and in which plant growth has begun, showing a number of plants 13 growing out and across the structure.

The substrate layer may be provided with seeds or other latent or growing vegetal matter by being pre-seeded. This can involve, for example, painting or spraying the layer with seeds and glue or including a layer of seed paper, for example, between the front layer and substrate layer. Seed paper is known and comprises seeds dispersed in a sheet. One supplier is Seed Developments Limited of Bridgwater, UK.

Figure 8:
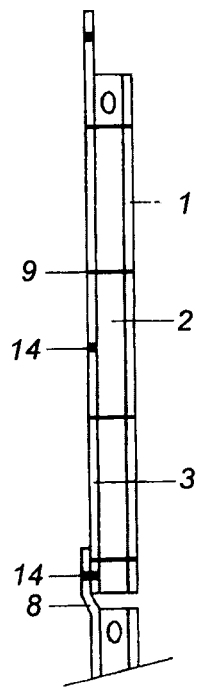
FIG. 8 shows how the backing layer may be connected, how adjacent sheeting systems may be connected, and how the system may be connected to a structure.

FIG. 8 shows a cross section illustrating the connections to the back layer at discrete points 9. It also shows fixings 14 on the backing layer, which might fix at the skirt, and might be used to connect the system to a structure, e.g. scaffolding or a construction site hoarding.

The sheeting may be made in any size. Typically, the upper and lower edges 5 and 6 are longer than the side edges so the sheeting is provided in an elongate format. In one example, it may be configured to be same size as standard scaffold sheeting, which is typically around 1.5-2.0 meter high and may be of perhaps 25 m to 50 m or more in length so that it may be handled and is stored using standard scaffolding or other temporary techniques. The sheeting may be provided on a roll and a sufficient amount drawn from the roll and cut as appropriate. In this case, the generally horizontal direction of the seams will be in the rolling/unrolling direction.

If seams are used at the bottom or other edges, these are most preferably also non-continuous. This enables excess water and nutrients, to exit the layered sheet. Where there are adjacent sheets for example, water and nutrients can travel from one sheet into another sheet located below.

In some examples, the upper and lower edges 5 and 6 need not necessarily be parallel.

In an example, only one seam is provided between the upper and lower edge.

After use on scaffolding, etc, the sheeting, or components of it (e.g. biodegradable parts), may be simply be placed on the ground and used to form a landscaping feature.

As well as stitching, other ways of forming non-continuous seams may be used, such as discontinuous hot welds, or any other method which allows for water movement across the seams, rather than acting as a barrier.

An irrigation channel may be formed by the seams, eg between two seams. An irrigation pipe can be inserted in here, so that water from this flows, by gravity down the sheet (via discontinuities in the seam) and from sheet to sheet.

The irrigation system may be a hydroponic irrigation system that provides nutrients and waters to the plants using a fertiliser system which is configured to use one or more irrigation pipes in the sheets.

Where multiple sheets are used with one higher than the other the water flow can be reduced in the irrigation pipes in lower sheets because the lower sheets also benefit from water flowing down from sheets above, helping to reduce water usage. This may be done by reducing the flow or amount of water/nutrients to an irrigation pipe provided in the lower sheet, or reducing the size of the pipe to lower sheets. Note that not all sheets need have irrigation pipes.

The invention claimed is:

1. A flexible layered fabric sheet comprising a porous front layer and a pre-seeded substrate layer for supporting root growth, the two layers together having an upper edge and a lower edge and being attached together with a plurality of non-continuous seams between the upper and lower edges, wherein the seams have a component of direction parallel to the upper and/or lower edge, wherein the non-continuous seams enable water to exit the layered fabric sheet at the lower edge, wherein the non-continuous seams further serve to slow water flow through the sheet in a direction from the upper edge to the lower edge, wherein the non-continuous seams are stitched seams, and wherein the flexible layered fabric sheet includes a region for receiving an irrigation pipe, and wherein the region for receiving the irrigation pipe is formed by a gap between two seams of the plurality of the non-continuous seams.

2. The flexible layered fabric sheet as claimed in claim 1, comprising an additional non-porous backing layer which is provided on a face of the substrate layer which is distal from the porous front layer.

3. The flexible layered fabric sheet as claimed in claim 1, wherein a layer of seed paper forms part of the substrate layer.

4. The flexible layered fabric as claimed in claim 3, wherein the seed paper layer of the substrate layer (i) rests on the remainder of the substrate layer and (ii) is situated between the remainder of the substrate layer and the porous front layer.

5. The flexible layered fabric sheet as claimed in claim 1, wherein the seams are spaced at intervals between the upper and lower edges.

6. The flexible layered fabric sheet as claimed in claim 1, wherein at least some of the seams intersect to form polygonal shapes.

7. The flexible fabric layered sheet system as claimed in claim 1, wherein the sheet has a non-porous backing layer and wherein the non-porous backing layer forms a lip portion extending above the upper edge of the porous front layer and the substrate layer and/or below the lower edge of the porous front layer and the substrate layer.

8. A vegetative wall, comprising one or more flexible layered fabric sheets as claimed claim 1 mounted upon a structure or a support such that the upper edge of the or each sheet lies vertically higher than the lower edge and an irrigation supply is arranged at or towards a top of the sheet or of at least an uppermost one of the sheets, such that irrigation water flows downwards through the sheet or sheets, slowed by the non-continuous seams, to thereby enable the seed with which the sheet or sheets is or are pre-seeded to germinate and grow into vegetation.

9. The vegetative wall as claimed in claim 8, wherein the one or more flexible layered fabric sheets comprise two or more flexible layered fabric sheets which are arranged one above the other such that irrigation water from the uppermost one of the sheets passes into at least one lower sheet.

10. The vegetative wall as claimed in claim 9, wherein at least one of the sheets has a non-porous backing layer forming a lip portion extending beyond a top and/or a bottom of the porous front layer and the substrate layer and another one of the sheets overlaps this lip portion.

11. The vegetative wall as claimed in claim 9, where the two or more flexible layered fabric sheets comprise two flexible layered fabric sheets, one higher than the other, such that the sheets are overlapped in a vertical direction.

12. The vegetative wall as claimed in claim 8, wherein the structure to which the flexible sheet or sheets are affixed is a structure of scaffolding poles.

13. A method of forming a vegetative wall, comprising mounting at least one flexible sheet as claimed in claim 1 upon a structure or a support such that the or each sheet lies in a disposition such that the upper edge is vertically higher than the lower edge, providing an irrigation supply to supply irrigation water at or towards a top of the sheet or a top of at least an uppermost one of the sheets and allowing water to permeate through the sheet or sheets to thereby cause the seeds which the or each sheet has been pre-seeded with to germinate, and vegetation to grow.

14. The method as claimed in claim 13, wherein the at least one flexible sheet comprises at least two flexible sheets which are mounted to the structure or the support such that at least one of the sheets lies vertically higher than at least one other sheet, such that irrigation water supplied to the uppermost one of the sheets flows downwards between that sheet and at least one lower sheet to irrigate the at least one lower sheet.

15. The method as claimed in claim 14, wherein an irrigation flow in the at least one lower sheet is lower than that of the uppermost one of the sheets.

16. The method as claimed in claim 13, wherein the at least one flexible sheet comprises two or more flexible sheets, at least one of the sheets having a non-porous backing layer extending beyond a top or a bottom of the porous front layer and the substrate layer to form a lip portion, wherein one of the sheets is mounted generally higher than another of the sheets and one of these sheets overlaps the lip portion of the other sheet.

17. The method as claimed in claim 13, wherein the at least one flexible sheet comprises two flexible sheets, wherein the two flexible sheets are situated one above the other, and one of the flexible sheets overlaps the other in a vertical direction.

* * * * *